United States Patent
Engquist et al.

(10) Patent No.: US 7,538,467 B2
(45) Date of Patent: May 26, 2009

(54) MAGNETIC POWDER METAL COMPOSITE CORE FOR ELECTRICAL MACHINES

(75) Inventors: John Engquist, Saint Charles, IL (US); David Farnia, Elburn, IL (US)

(73) Assignee: Burgess-Norton Mfg. Co., Inc, Geneva, IL (US)

( * ) Notice: Subject to any disclaimer, the term of this patent is extended or adjusted under 35 U.S.C. 154(b) by 394 days.

(21) Appl. No.: 11/446,260

(22) Filed: Jun. 5, 2006

(65) Prior Publication Data
US 2007/0278891 A1 Dec. 6, 2007

(51) Int. Cl.
*H02K 1/08* (2006.01)
(52) U.S. Cl. .................... 310/216; 310/217
(58) Field of Classification Search .............. 310/44, 310/216–218
See application file for complete search history.

(56) References Cited
U.S. PATENT DOCUMENTS
6,441,530 B1 * 8/2002 Petersen .............. 310/216

2004/0164639 A1 * 8/2004 Yamamoto et al. ........ 310/216
2006/0103258 A1 * 5/2006 Nakano et al. ............ 310/218

* cited by examiner

*Primary Examiner*—Tran N Nguyen
(74) *Attorney, Agent, or Firm*—Edward J. Brosius

(57) ABSTRACT

A compacted magnetic powder metal component assembly for use in an electrical machine is provided. Each component assembly has a top section and a bottom section.

Each top section is comprised of a generally cylindrical center portion, a plurality of winding supports extending radially outward from the center portion and a core segment at a radial edge of each winding support.

Each bottom section is comprised of a generally cylindrical center portion, a plurality of winding supports extending radially outward from the center portion, and a core segment in a radial edge of each winding segment support.

The top section and the bottom section are combined to form the component assembly.

14 Claims, 3 Drawing Sheets

MAGNETIC POWDER METAL COMPOSITE CORE FOR ELECTRICAL MACHINES

BACKGROUND OF THE INVENTION

The present invention relates to core components for use in electrical machines and, more particularly, a component assembly for use in an electrical machine, most typically an electric motor.

Electrical machines such as motors and generators have a stationary element, usually termed a stator, and movable or rotating elements, typically termed the rotor. The interaction between the stator and the rotor is caused by the interaction of a magnetic field generated by either the stator or the rotor. Such magnetic field is usually generated or induced by electric currents in a winding placed on either the stator or the rotor. Such winding usually comprises a plurality of coils wound about a winding support. The winding support is usually comprised of a soft magnetic material which traditionally is made of laminations of selected steel materials. The laminations are insulated from each other in order to reduce eddy currents.

One concern in the design of such electrical machines is the need or desire to reduce the cogging torque between the stator and the rotor in the core of the electrical machine. Having skewed stators or rotors is known to reduce the cogging torque and create a more efficient interface in the electromagnetic field between the stator and the rotor. This produces a more efficient motor or generator. However, one problem that exists is the manufacture of the rotor or stator with skewed teeth or outer surfaces of the core segments.

It has become known to replace the laminated steel materials of the stator or rotor cores with ferro-magnetic powder particles that are compacted in a powder metallurgy operation to form the winding support. The ferro-magnetic powder particles themselves are electrically insulated from each other so that the resulting compacted product exhibits a low eddy current loss in a manner similar to the use of stacks of laminated steel materials. Such use of compacted metal powders comprised of ferro-magnetic powder particles for cores in electrical machines is disclosed in U. S. Pat. Nos. 6,956,307, 6,300,702 and 6,441,530.

Accordingly, it is an object of the present invention to provide an improved electrical machine component assembly for use in an electrical machine wherein the core segments have skewed ends. Accordingly, the cogging torque of the motor itself is reduced.

It is another object of the present invention to provide an improved stator or rotor assembly for use in electrical machines wherein the assembly utilizes core components comprised of compacted ferrous-magnetic powder.

SUMMARY OF THE INVENTION

The present invention provides an improved component assembly for an electrical machine and, more specifically, an improved stator or rotor assembly for use in an electrical motor or generator. The improved component assembly comprises a top section and a bottom section. Each top section is comprised of a generally cylindrical center portion, a plurality of winding supports extending radially outward from the center portion, and a core segment at a radial edge of each winding support.

Each bottom section is comprised of a generally cylindrical center portion, a plurality of winding supports extending radially outward from the center portion, and a core segment in a radial edge of each winding segment support.

The top section and the bottom section are combined to form the component assembly.

Further, each of the top section and the bottom section are formed of ferrous magnetic powder particles. Such ferrous magnetic powder particles are mutually insulated. The ferrous magnetic metal powder particles are pressure formed in a powder metal operation into a solid form.

It is a feature of the present invention that such an improved component assembly comprised of a combined top section and bottom section with skewed core segments formed of mutually insulated ferrous magnetic powder metal particles provides improved performance in the electrical machine. Such improved performance is mainly due to the skewed core segments which reduce the cogging torque of the electrical machine and the use of the mutually insulated ferrous magnetic powder metal particles to form the top section and the bottom section which also reduces eddy current losses.

DESCRIPTION OF THE PREFERRED EMBODIMENTS

Figure 1:
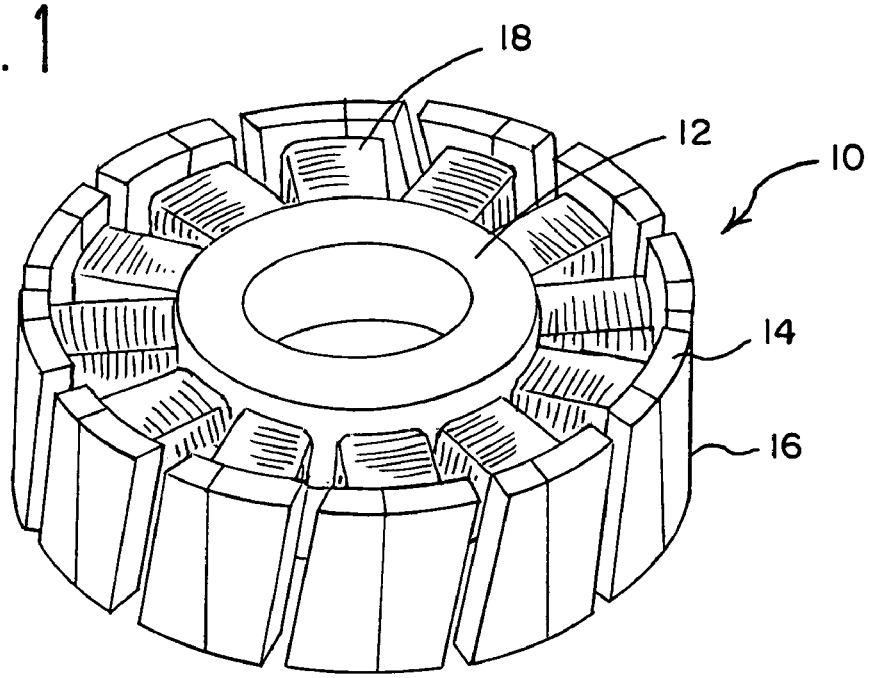
FIG. 1 is a perspective view of a component assembly is accordance with an embodiment of the present invention.
Figure 2:
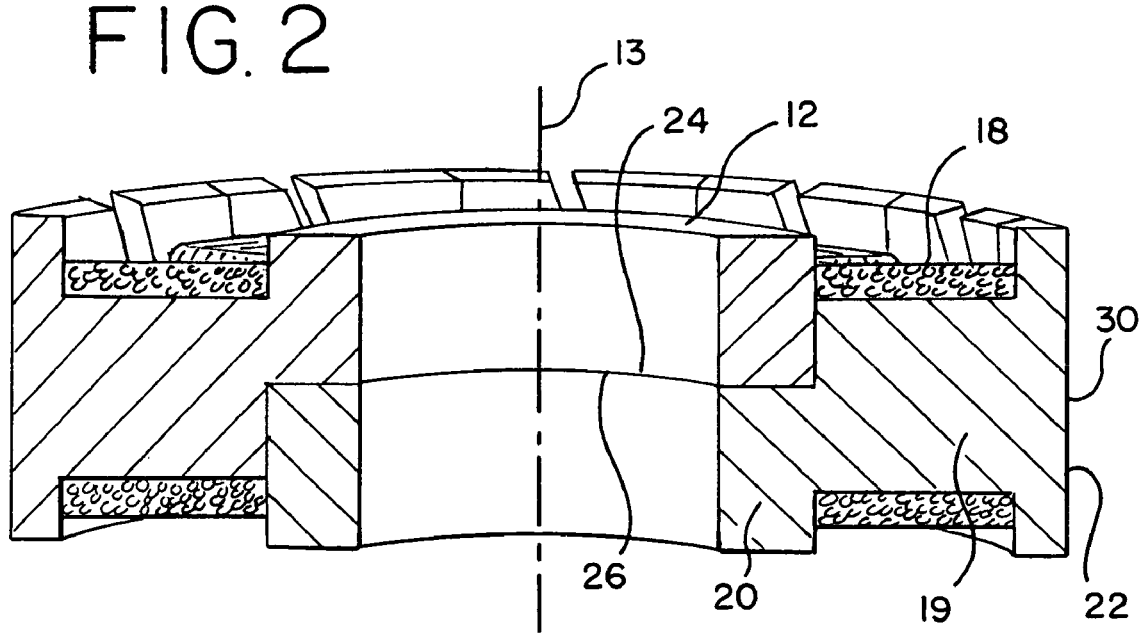
FIG. 2 is a cross sectional view of a component assembly in accordance with an embodiment of the present invention.
Figure 3:
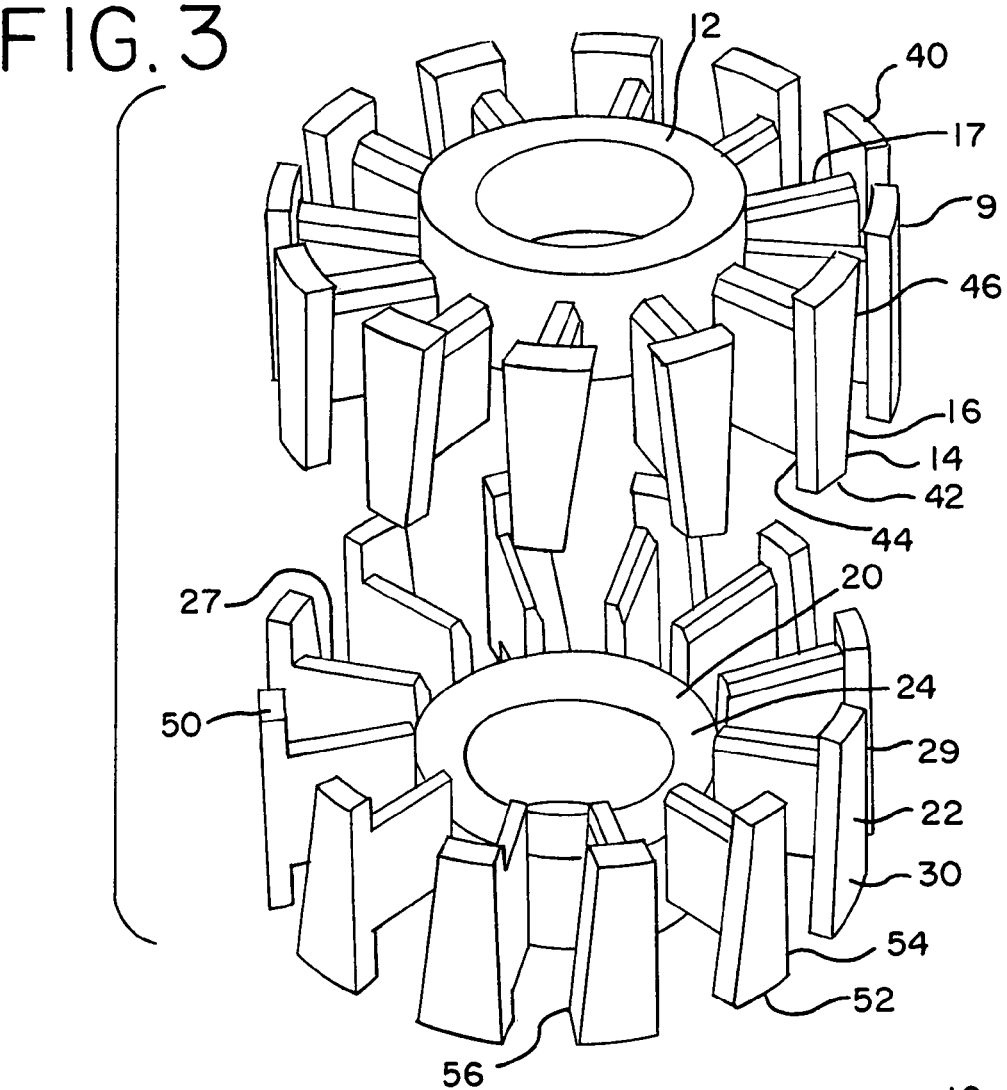
FIG. 3 is a perspective view of a component assembly, with individual components shown separated.
Figure 4:
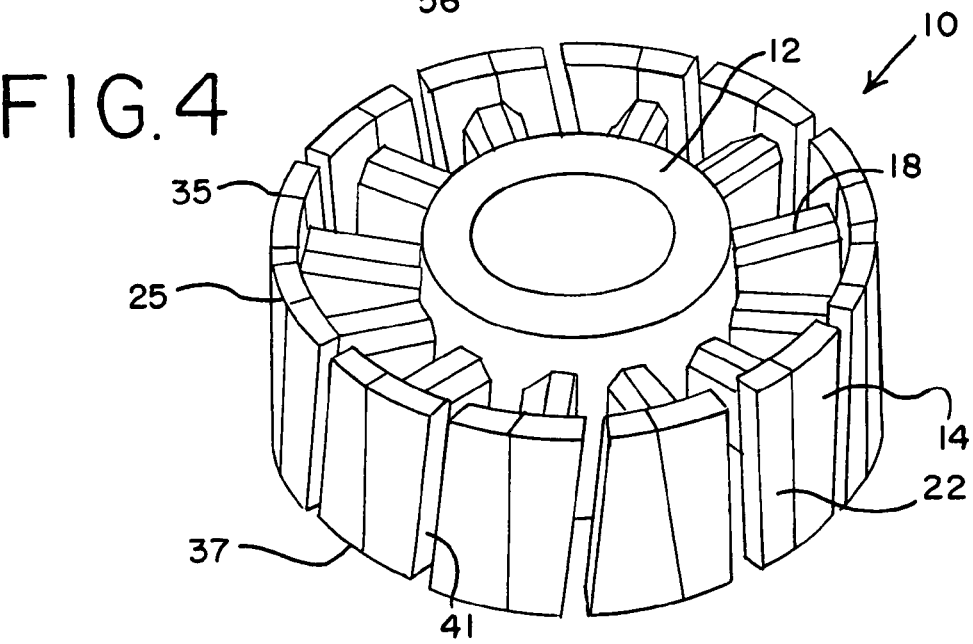
FIG. 4 is a perspective view of a component assembly in accordance with an embodiment of the present invention.

Referring now to FIGS. 1-4 of the drawings, a component for use in an electrical machine is shown generally at 10. Such component 10 can be a stator or a rotor for use most typically in a motor, but component 10 could also be used in a generator.

Component 10 is seen to be comprised of a top section 9 and having a center portion 12. Center portion 12 is usually cylindrical in shape with a central open section. Center portion 12 includes a radial center axis 13. A plurality of winding supports 17 extend radially outward from center portion 12 outer surface. The number of each such winding supports can vary based on the size and design of component 10, but the number is usually between eight and twenty-four. Each winding support 17 is generally rectangular in shape, having a top edge and a bottom edge that are parallel and an inside edge adjacent center portion 12 outer surface. Each winding support 17 also has an outer edge.

Each outer edge of each winding support 17 has a top section core segment 14 affixed thereto or protruding therefrom. Each top section core segment 14 has a top edge 40, and a bottom edge 42; top edge 40 and bottom edge 42 are usually parallel. Each top section core segment 14 also includes a first side edge 44 and a second side edge 46. First side edge 44 is usually parallel with radial center axis 13. Second side edge 46 is usually skewed at an acute angle to radial center axis 13; such outer angle is usually between five and thirty degrees.

Center portion 12 of top section 9 is generally cylindrical with a centered open section and a radial center axis 13. Center portion 12 has a generally flat bottom surface 26.

Each top section core segment 14 has an outer surface 16 that is convex about top section radial axis 13. The convex nature of the top section core segment 14 outer surface 16 is designed to form a generally cylindrical form outer edge of top section 9.

Component 10 is seen to be also comprised of a bottom section 29 having a center portion 20. Center portion 20 is usually cylindrical in shape with a central open section. Center portion 20 includes a radial center axis 13 when top section 9 is combined with bottom section 29. A plurality of winding supports 27 extend radially outward from center portion 20 outer surface. The number of such winding supports can vary based on the size and design or component 10, but the number is usually between eight and twenty-four. Each winding support 27 is generally rectangular in shape, having a top edge and a bottom edge that are parallel and an inside edge adjacent center portion 20 outer surface. Each winding support 27 also has an outer edge.

Each outer edge of each winding support 27 has a bottom section core segment 22 affixed thereto or protruding therefrom. Each bottom section core segment 22 has a top edge 50 and a bottom edge 52; top edge 50 and bottom edge 52 are usually parallel. Each bottom section core segment 22 also includes a first side edge 54 and a second side edge 56. First side edge 54 is usually parallel with radial center axis 13. Second side edge 56 is usually skewed at an acute angle to radial center axis 13; such outer angle is usually between five and thirty degrees.

Center portion 20 of bottom section 29 is generally cylindrical with a central open section and a radial center axis 13. Center portion 20 has a generally flat top surface 24.

Each bottom section core segment 22 has an outer surface 30 that is convex about bottom section radial axis 13. The convex nature of bottom section core segment 22 outer surface 30 is designed to form a generally cylindrical form outer edge of bottom section 29.

When top section 9 is fitted on top of bottom section 29, a complete component 10 is formed. The bottom surface 26 of top section center portion 12 is seen to fit against top surface 24 of bottom section center portion 20.

Each winding support 17 of top section 9 is seen to fit adjacent a winding support 27 of bottom section 29. A generally rectangular combined winding support is formed to receive winding 18. Winding 18 is a typical winding of an insulated electrical wire that provides the magnetic field for the electrical machine.

Each top section core segment 14 is seen to combine with an adjacent bottom section core segment 22 to form a combined skewed core segment 25 in the assembled component 10.

Side edge 44 of each top section core segment 14 is seen to be placed adjacent side edge 54 of each bottom section core segment 22. In so placing each top section core segment 14 adjacent a bottom section core segment 22, combined skewed core segment 25 is formed. Combined skewed core segment 25 is seen to have a top edge 35 and a bottom edge 37 that are usually parallel. Combined skewed core segment 25 is also seen to have a first side edge 39 and a second side edge 41 that are also usually parallel, but at an acute angle of from five to thirty degrees from the top edge 35. Hence, each combined skewed core segment 25 is usually a parallelogram; further, each combined skewed core segment 25 is spaced to be electrically insulated from adjacent combined skewed core segments.

Such combined core segments 25 where utilized as stators or rotors in electrical machines such as motors tend to reduce the cogging torque of the electrical motor.

It should be understood that top section 9 and bottom section 29 are usually unitary structures comprised of a compacted ferrous magnetic powder. The compacted ferrous magnetic powder itself is comprised of insulated ferrous powder particles. The ferrous magnetic powder is die compacted in a powder metal operation. Some subsequent heat treatment to produce stress relieved components may be performed. Such heat treatment also aids in providing a compound with high magnetic permeability and low core loss. The ferrous magnetic powder particles used are insulated electrically from each other to diminish the build up of eddy currents within the assembled component 10.

Figure 5:
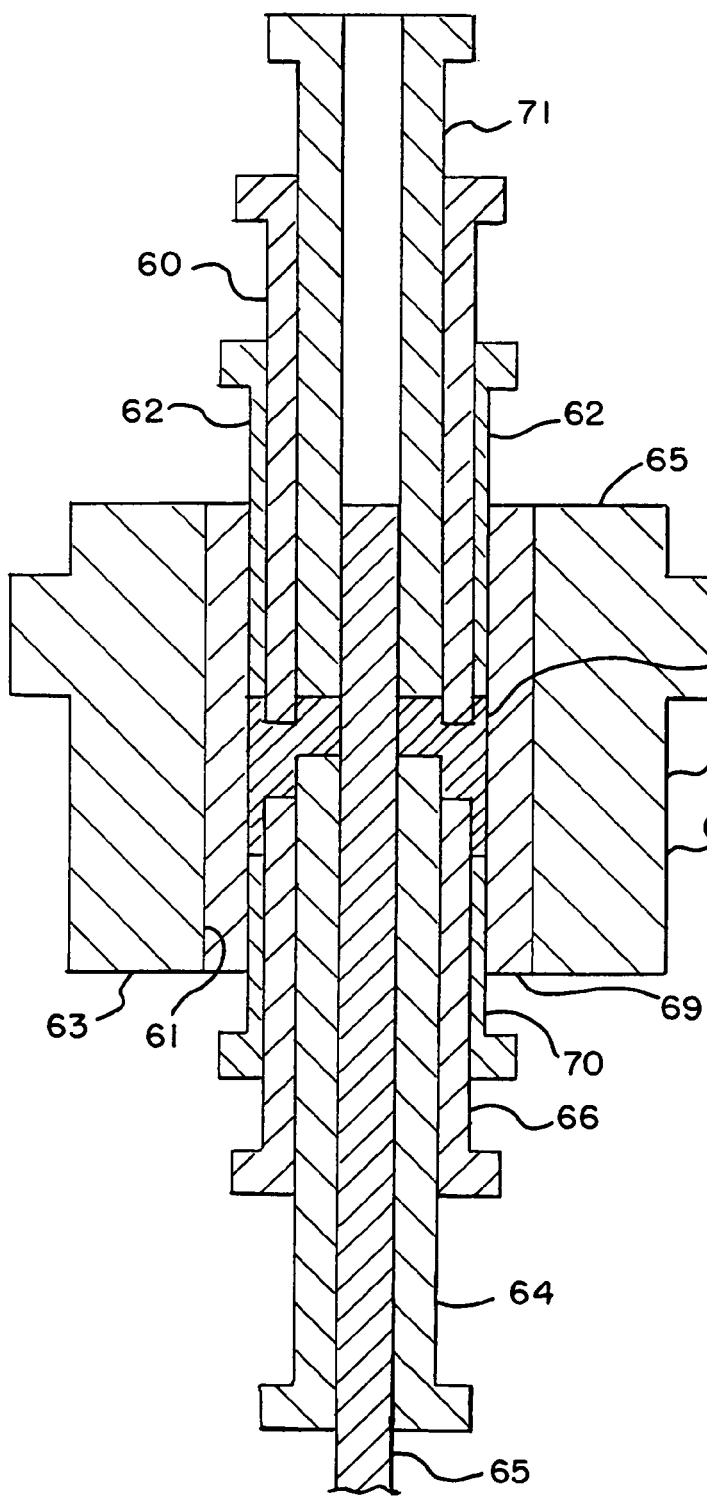
FIG. 5 is a cross-sectional view of an embodiment of a die compacting arrangement in accordance with the present invention.
Figure 6:
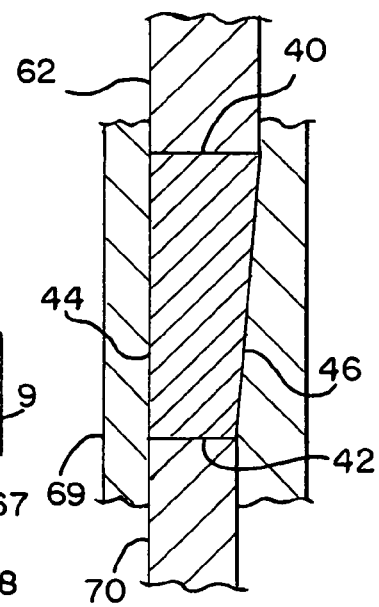
FIG. 6 is a detailed cross sectional view of an embodiment of a die compacting arrangement in accordance with the present invention.

Referring now to FIGS. 5-6, a detailed view of the die forming of top section 9 is shown. Top section 9 is shown with its previously described components. Using ferrous powder metal die compaction techniques, it is quite difficult to form a skewed edge such as second side edge 46. The difficulty arises from the compaction of a skewed edge to the direction of the die compaction and the difficulty of die compaction and the difficulty in removing the compacted part having a skewed edge from the die.

The method of the present invention accomplishes the die compaction of the top section 9, and also bottom section 29, using, in one embodiment, the die arrangement shown in FIGS. 5 and 6.

Die 68 is shown as being somewhat cylindrical in over all shape, given the cross sectional view of FIG. 5. Die 68 has an outer edge 67, top edge 65, bottom edge 63 and inner edge 61. Inner edge 61 of die 68 abuts inner die section 69. Inner die section 69 has a generally cylindrical opening centrally located therein. Inner die section 69 has shelf edges that form first side edge 44 and second side edge 46 of top section 9.

First upper fill punch 62 is adjacent the inner edge of infer die section 69. Second upper fill punch 60 is adjacent the inner edge of first upper fill punch 62. Third upper fill punch 71 is adjacent the inner edge of second upper fill punch 60.

Similarly, first lower fill punch 70 is adjacent the inner edge of inner die section 69. Second lower fill punch 66 is adjacent the inner edge of first lower fill punch 70. Third lower fill punch 64 is adjacent the inner edge of second lower fill punch 66.

Al fill punches mentioned above are generally cylindrical in shape given the generally cylindrical shape of top section 9 and die 68.

A core rod 65 extends along what will be the radial center axis 13 of top section 9. Core rod 65 is adjacent the inner edges of third upper fill punch 71 and third lower fill punch 64.

In operation, the opening corresponding to what will become top section 9 is filled with the appropriate ferrous magnetic powder. The die compaction is accomplished using, in one embodiment, the die arrangement described above.

The ferrous magnetic powder used to form top section 9 and bottom section 29 is usually a high purity soft magnetic iron powder. The ferrous powder particles are coated with an organic, inorganic, or a combination insulating coating.

The top section 9 and bottom section 29 may be bonded to each other using a bonding adhesive or an epoxy. It is also possible for the top section 9 to be held together to bottom section 29 sufficiently, depending on component design, by the windings 18.

What is claimed is:

1. An assembly for use as a rotor or a stator in an electrical machine, the assembly comprising a top section having a generally cylindrical center portion having a central radial axis, a plurality of winding supports extending radially outward from the center portion, and a top section core segment at a radial edge of each winding support, the top section core segment having a generally convex outer surface, along the radial central axis of the top section, a bottom section having a generally cylindrical center portion having a central axis, a plurality of winding supports extending radially outward from the center portion, and a bottom section core segment at a radial edge of each winding support, the bottom section core segment having a generally convex outer surface along the radial central axis of the bottom section, the top section and bottom section fitted together such that the top section core segment and the bottom section core segment combine in an adjacent manner to form a skewed core segment.

2. The assembly of claim 1 wherein each top section core segment comprises a top edge, a bottom edge, and two side edges, with the top edge and the bottom edge being generally parallel, and the two side edges are not parallel.

3. The assembly of claim 1 wherein each top section core segment comprises a top edge, a bottom edge, and two side edges, with the top edge and the bottom edge being generally parallel, and one of two side edges being perpendicular to the top edge.

4. The assembly of claim 1 wherein each bottom section core segment comprises a top edge, a bottom edge and two side edges, with the top edge and the bottom edge being generally parallel, and the two side edges are not parallel.

5. The assembly of claim 1 wherein each bottom section core segment comprises a top edge, a bottom edge, and two side edges, with the top edge and the bottom edge being generally parallel, and one side edge being perpendicular to the top edge.

6. The assembly of claim 1 wherein each top section core segment has outer edges with a generally trapezoidal configuration.

7. The assembly of claim 1 wherein each bottom section core segment has outer edges with a generally trapezoidal configuration.

8. The assembly of claim 1 wherein the top section is comprised of ferrous magnetic metal powder particles.

9. The assembly of claim 1 wherein the top section is a unitary structure comprised of compressed ferrous magnetic metal powder particles.

10. The assembly of claim 1 wherein the bottom section is comprised of ferrous magnetic metal powder particles.

11. The assembly of claim 1 wherein the bottom section is a unitary structure comprised of compressed ferrous magnetic metal powder particles.

12. An assembly for use as a rotor or a stator in an electrical machine, the assembly comprising a top section having a generally cylindrical center portion having a central radial axis, a plurality of winding supports extending radially outward from the center portion, and a top section core segment at a radial edge of each winding support, the top section core segment having a generally convex outer surface, along the radial central axis of the top section, a bottom section having a generally cylindrical center portion having a central axis, a plurality of winding supports extending radially outward from the center portion, and a bottom section core segment at a radial edge of each winding support, the bottom section core segment having a generally convex outer surface along the radial central axis of the bottom section, the top section and bottom section fitted together such that the top section core segment and the bottom section core segment combine to form a skewed core segment, wherein a combination of the top section core segment and the bottom section core segment forming a combined core segment having an outer edge generally forming a parallelogram.

13. An assembly for use as a rotor or a stator in an electrical machine, the assembly comprising a top section having a generally cylindrical center portion having a central radial axis, a plurality of winding supports extending radially outward from the center portion, and a top section core segment at a radial edge of each winding support, the top section core segment having a generally convex outer surface, along the radial central axis of the top section, a bottom section having a generally cylindrical center portion having a central axis, a plurality of winding supports extending radially outward from the center portion, and a bottom section core segment at a radial edge of each winding support, the bottom section core segment having a generally convex outer surface along the radial central axis of the bottom section, the top section and bottom section fitted together such that the top section core segment and the bottom section core segment combine to form a skewed core segment, wherein the top section core segment when combined with the bottom section core segment form a combined core segment having a top edge and a bottom edge that are parallel to one another, and the top edge and the bottom edge are perpendicular to the central axis of the top section of the assembly.

14. An assembly for use as a rotor or a stator in an electrical machine, the assembly comprising a top section having a generally cylindrical center portion having a central radial axis, a plurality of winding supports extending radially outward from the center portion, and a top section core segment at a radial edge of each winding support, the top section core segment having a generally convex outer surface, along the radial central axis of the top section, a bottom section having a generally cylindrical center portion having a central axis, a plurality of winding supports extending radially outward from the center portion, and a bottom section core segment at a radial edge of each winding support, the bottom section core segment having a generally convex outer surface along the radial central axis of the bottom section, the top section and bottom section fitted together such that the top section core segment and the bottom section core segment combine to form a skewed core segment, wherein the top section core segment and the bottom section core segment when combined form a combined core segment having a top edge and a bottom edge that are parallel to one another, and the top edge and the bottom edge are perpendicular to the central axis of the top section of the assembly, and the top and the bottom core segments having a first side edge and second side edge that are generally parallel to one another, and each of the first and second side edges is at an acute angle to the central radial axis of the top section of the assembly.

* * * * *